(12) United States Patent
Natanzon et al.

(10) Patent No.: US 9,128,855 B1
(45) Date of Patent: Sep. 8, 2015

(54) FLASH CACHE PARTITIONING

(71) Applicant: EMC Corporation, Hopkinton, MA (US)

(72) Inventors: Assaf Natanzon, Tel Aviv (IL); David Erel, Shoham (IL)

(73) Assignee: EMC Corporation, Hopkinton, MA (US)

( * ) Notice: Subject to any disclaimer, the term of this patent is extended or adjusted under 35 U.S.C. 154(b) by 150 days.

(21) Appl. No.: 13/927,681

(22) Filed: Jun. 26, 2013

(51) Int. Cl.
*G06F 13/00* (2006.01)
*G06F 12/08* (2006.01)

(52) U.S. Cl.
CPC ................... *G06F 12/0871* (2013.01)

(58) Field of Classification Search
CPC .................. G06F 12/0866; G06F 12/0862
See application file for complete search history.

(56) References Cited

U.S. PATENT DOCUMENTS

2012/0222005 A1\* 8/2012 Harris et al. ................. 717/120

\* cited by examiner

*Primary Examiner* — Yong Choe
(74) *Attorney, Agent, or Firm* — Krishnendu Gupta; Joseph D'Angelo

(57) ABSTRACT

A computer implemented method, system, and computer program product for cache management comprising recording metadata of IO sent from the server to a storage array, calculating a distribution of a server cache based on the metadata, receiving an IO directed to the storage array, and revising an allocation of the server cache to the plurality of storage mediums based on the calculated distribution and the IO.

20 Claims, 12 Drawing Sheets

FLASH CACHE PARTITIONING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

A traditional storage array (herein also referred to as a "disk storage array," "disk array," "data array," or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed (in case of spinning media), serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

The use of solid-state storage devices is increasing in popularity as solid-state memory has advanced to the point where cost and density of memory is such that organizations can afford to operate with systems that store and process terabytes of data. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY

A computer implemented method, system, and computer program product for cache management comprising recording metadata of IO sent from the server to a storage array, calculating a distribution of a server cache based on the metadata, receiving an IO directed to the storage array, and revising an allocation of the server cache to the plurality of storage mediums based on the calculated distribution and the IO.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
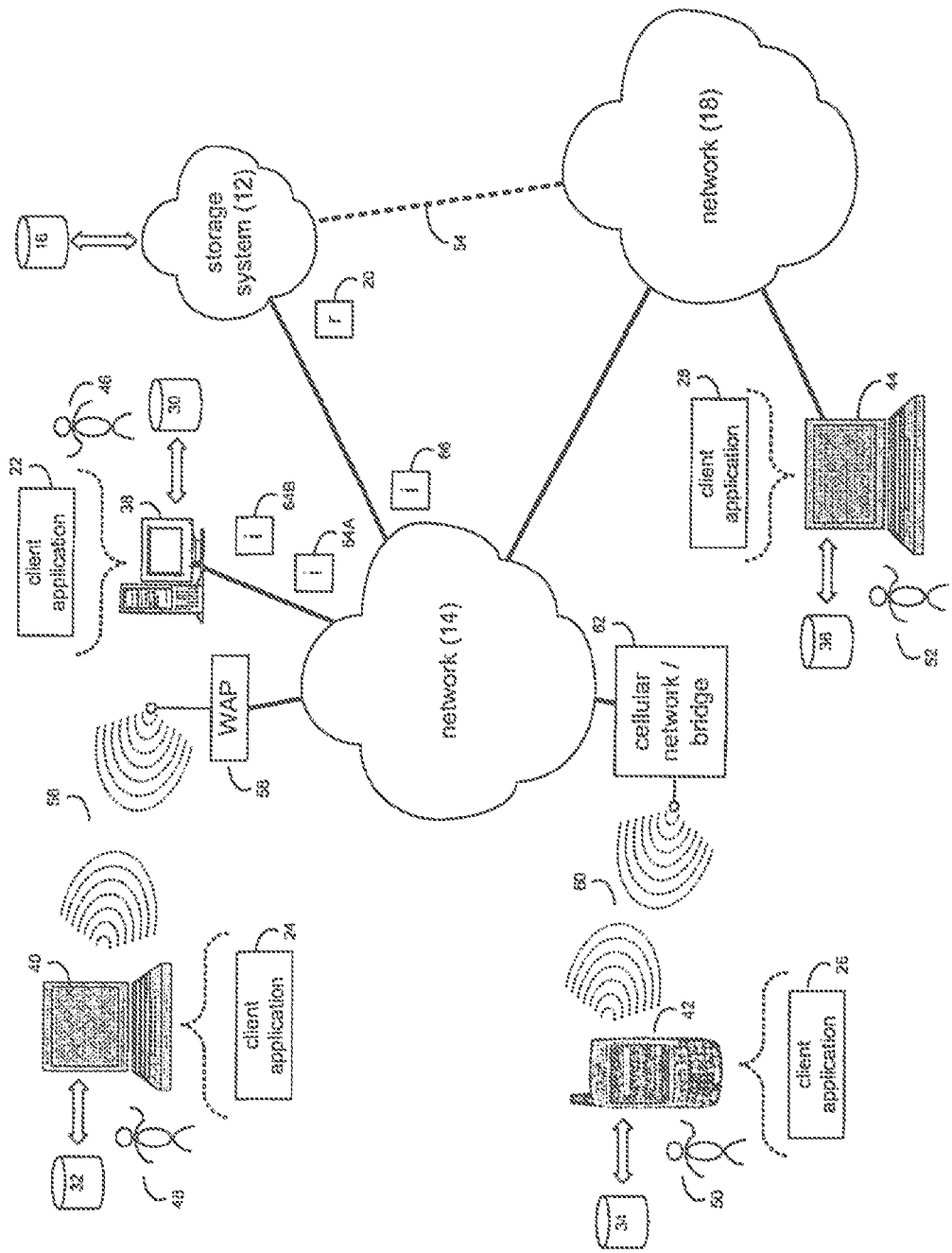
FIG. 1 is a simplified illustration of an environment with a data storage system, in accordance with an embodiment of the present disclosure.

In some embodiments, the current disclosure may enable monitoring data requests made by one or more applications being executed on a host or server to generate a prediction concerning a quantity of data that may be needed by the one or more applications in the future. In certain embodiments, some of the quantity of data may be stored within a backend cache system included within a data array coupled to the host. In certain embodiments, a host or server connected to a data array may have a cache. In some of these embodiments, some of the quantity of data may be stored in the host or server cache.

In some embodiments, the front end cache system may be a flash-based front end cache system. In most embodiments, a quantity of data of the data array may be stored within a frontend cache system included within the host. In other embodiments, a data array may include a plurality of electro-mechanical storage devices. In further embodiments, a quantity of data may be retrieved from the plurality of electro-mechanical storage devices. In at least some embodiments, the backend cache system may be a flash-based backend cache system. In most embodiments, the host may be configured as an application server. In further embodiments, information about data access requests serviced by the host based cache may be shared with the storage array to generate an overall understanding of data access requests.

A discussion of cache performance may be found in U.S. patent application Ser. No. 13/341,422 entitled "SYSTEM AND METHOD FOR IMPROVING CACHE PERFORMANCE," filed Dec. 30, 2011, which is hereby incorporated herein by reference in its entirety.

In different embodiments, the present disclosure may be embodied as a method, system, or computer program product. In alternative embodiments, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." In further embodiments, the present disclosure may take the form of a computer program product on a non-transitory computer-usable storage medium having computer-usable program code embodied in the medium.

In some embodiments, any suitable computer usable or computer readable medium may be utilized. In at least one embodiment, the computer-usable or computer-readable medium may be, for example but not limited to, an electronic, magnetic, optical, electromagnetic, infrared, or semiconductor system, apparatus, device, or propagation medium. In alternative embodiments, more specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In at least some embodiments, the computer-usable or computer-readable medium may be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In further embodiments, a computer-usable or computer-readable medium may be any non-transitory medium that can contain, store, communicate, propagate, or transport the program for use by or in connection with the instruction execution system, apparatus, or device. In certain embodiments, the computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

In some embodiments, computer program code for carrying out operations of the present disclosure may be written in an object oriented programming language such as Java, Smalltalk, C++ or the like. In other embodiments, the computer program code for carrying out operations of the present disclosure may also be written in conventional procedural programming languages, such as the "C" programming language or similar programming languages. In at least one embodiment, the program code may execute entirely on the user's computer, partly on the user's computer, as a stand-alone software package, partly on the user's computer and partly on a remote computer or entirely on the remote computer or server. In an embodiment, the remote computer may be connected to the user's computer through a local area network (LAN) or a wide area network (WAN), or the connection may be made to an external computer (for example, through the Internet using an Internet Service Provider).

In some embodiments, the present disclosure may described below with reference to flowchart illustrations and/or block diagrams of methods, apparatus (systems) and computer program products according to embodiments of the disclosure. In certain embodiments, each block of the flowchart illustrations and/or block diagrams, and combinations of blocks in the flowchart illustrations and/or block diagrams, may be implemented by computer program instructions. In at least one embodiment, computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In certain embodiments, computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

In some embodiments, computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to the example embodiment of FIG. 1, there is shown data caching process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

In this embodiment, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of data caching process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

In certain embodiments, the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. In certain embodiments, Bluetooth may be a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
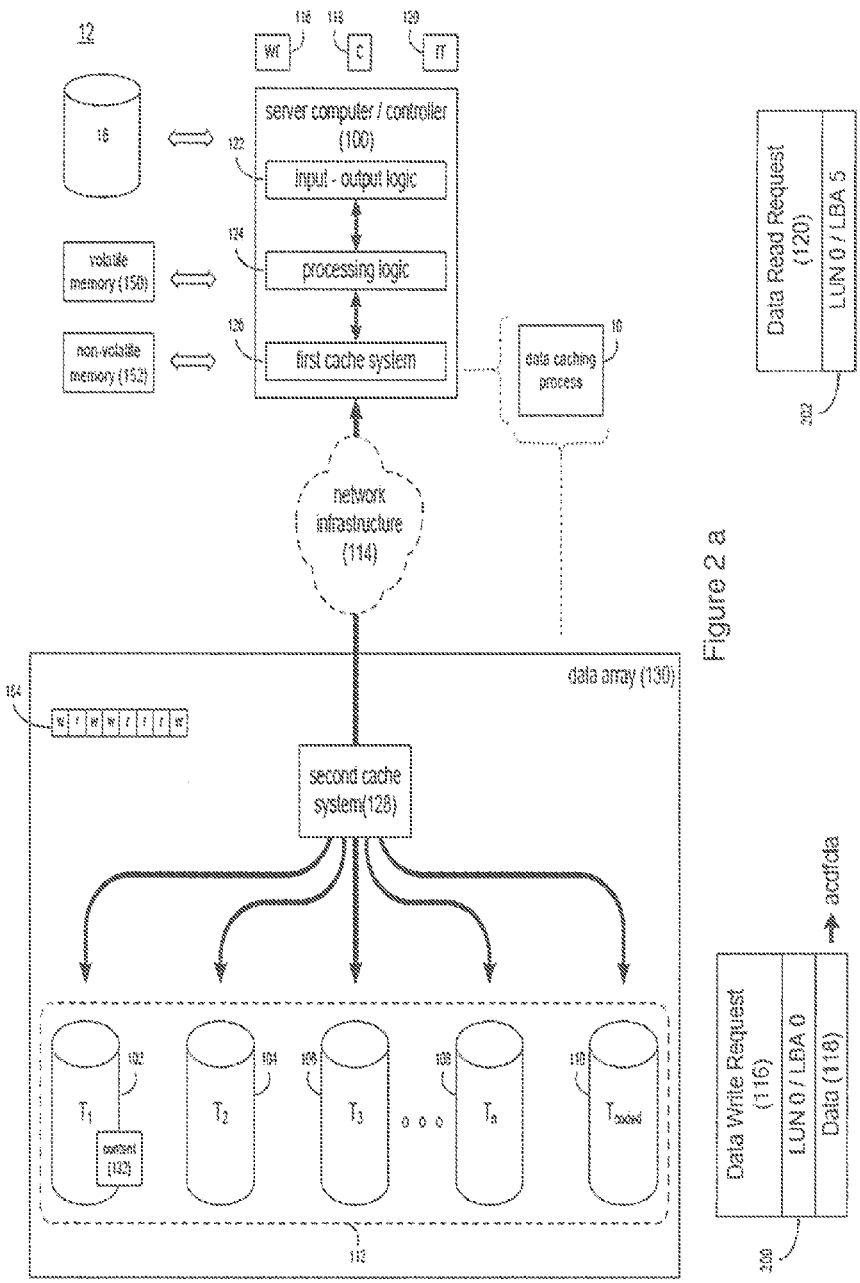
FIG. 2a is a simplified illustration of a data storage system with a cache and a server with a cache, in accordance with an embodiment of the present disclosure.
FIG. 2b is a diagrammatic view of a data write request for use with the data caching process, in accordance with an embodiment of the present disclosure.
FIG. 2c is a diagrammatic view of a data read request for use with a data caching process, in accordance with an embodiment of the present disclosure.

Referring also to the example embodiment of FIG. 2a, storage system 12 may include a server computer/controller (e.g. server computer/controller 100), and a plurality of storage targets T 1-n (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. In this embodiment, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data caching process 10. The instruction sets and subroutines of data caching process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of data requests (e.g., data request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of data requests (e.g., data request 20), the overall performance of storage system 12 may be enhanced. As will be described below in greater detail, second cache system 128 may be a content-aware cache system.

As discussed above, the instruction sets and subroutines of data caching process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of data caching process 10 may be executed by one or more processors (not shown) and one or more memory architectures (not shown) included within data array 130.

Referring also to the example embodiments of FIGS. 2c and 2C, data request 20 (e.g. data read request 116 and/or data write request 120) may be processed by server computer/controller 100 to extract pertinent information concerning these data requests.

When data request 20 is a data write request (e.g., write request 116), write request 116 may include content 118 to be written to data array 130. Additionally, write request 116 may include a storage address 200 that defines the intended storage location within storage array 130 at which content 118 is to be stored. For example, storage address 200 may define a particular logical unit within data array 130 (e.g., a LUN or Logical Unit Number) and a particular storage address within that specific logical unit (e.g., an LBA or Logical Block Address) for storing content 118.

Concerning read request 120, these requests do not include any content to be written to data array 130, as these are read requests and concern content to be read from data array 130. Read request 120 may include a storage address 202 that defines the storage location within storage array 130 from which content is to be retrieved. For example, storage address 202 may define a particular logical unit within data array 130 (e.g., a LUN or Logical Unit Number) and a particular storage address within that specific logical unit (e.g., an LBA or Logical Block Address) for retrieving the content sought from data array 130.

Data caching process 10 may maintain content directory 250, which may be used to locate various pieces of content within first cache system 126. In one particular embodiment of content directory 250, content directory 250 may include plurality of entries 252, wherein each of these entries may identify: data array storage address 200/202 (e.g. a logical storage unit and a storage address at which a specific piece of previously-written content is located within storage array 130); first cache address 254 (e.g., the location within first cache system 126 at which the specific piece of previously-written content is also located), and content identifier 256 for the specific piece of previously-written content. Accordingly, content directory 250 may identify the location of specific pieces of content included within first cache system 126 and their corresponding pieces of data within data array 130, as well as a content identifier that uniquely identifies the specific piece of content.

Content identifier 256 may be used in a content-aware caching system and may, specifically, be a mathematical representation of the specific piece of previously-written content that may allow e.g. server computer/controller 100 to quickly determine whether two pieces of previously-written content are identical, as identical pieces of content would have identical content identifiers. In one particular embodiment, content identifier 256 may be a hash function (e.g., a cryptographic hash) of the previously-written content. Accordingly, through the use of a content-aware caching system, duplicate data entries within first cache system 126 and/or second cache system 128 may be quickly identified, avoided, and/or eliminated.

In these embodiments, a hash function may be an algorithm/subroutine that maps large data sets to smaller data sets. The values returned by a hash function are typically called hash values, hash codes, hash sums, checksums or simply hashes. Hash functions are mostly used to accelerate table lookup or data comparison tasks such as e.g., finding items in a database and detecting duplicated or similar records in a large file.

General Read Request Processing:

During operation of server computer/controller 100, data caching process 10 may receive read request 120 on first cache system 126, wherein read request 120 identifies previously-written content (as defined by storage address 202) included within data array 130.

For example, assume that user 46 is using client application 22 to access data (i.e. content 132) that is currently being stored on data array 130. Accordingly, client application 22 may generate read request 120 which, as discussed above, may define a particular logical unit within data array 130 (e.g., a LUN or Logical Unit Number) and a particular storage address within that specific logical unit (e.g., an LBA or Logical Block Address) for retrieving content 132 sought from data array 130 by client application 22.

Assume that read request 120 defines LUN0/LBA5 as the location of content 132 within data array 130. Upon receiving read request 120, data caching process 10 may compare the location of content 132 within data array 130 (namely LUN0/LBA5) with each of the plurality of entries 252 defined within content directory 250 to determine if a copy of content 132 is locally available (i.e., cached) within first cache system 126. If LUN0/LBA5 was defined within content directory 250 (meaning that a local cached copy of content 132 is present/available within first cache system 126), that particular entry would also define a corresponding first cache address (e.g. first cache address 254) within first cache system 126 at which content 132 would be locally-available and retrievable from the first cache system 126. Conversely, in the event that LUN0/LBA5 is not defined within content directory 250 (meaning that a local cached copy of content 132 is not present/available within first cache system 126), data caching process 10 may need to obtain content 132 identified in read request 120 from data array 130.

In this particular example, since LUN0/LBA5 is not defined within content directory 250, a local cached copy of content 132 is not present/available within first cache system 126 and data caching process 10 will be need to obtain content 132 from data array 130.

Once content 132 is obtained by data caching process 10 from data array 130, data caching process 10 may store content 132 within first cache system 126 and may provide content 132 to client application 22, thus satisfying read request 120. Additionally, content directory 250 may be amended by data caching process 10 to include an entry (e.g., entry 258) that defines the data array storage address 200/202 (e.g. LUN0/LBA5); first cache address 254 (e.g., 111110), and content identifier 256 (e.g., ab1ccba) for content 132.

As discussed above, data array 130 may include second cache system 128. Accordingly, data caching process 10 may execute the above-described functionality with respect to second cache system 128.

General Write Request Processing:

During operation of server computer/controller 100, data caching process 10 may receive write request 116 on first cache system 126, wherein write request 116 identifies new content (e.g., content 118) to be written to data array 130.

For example, assume that user 46 is using client application 22 to create content (i.e. content 118) that is to be stored on data array 130. Accordingly, client application 22 may generate write request 116 which, as discussed above, may define a particular logical unit within data array 130 (e.g., a LUN or Logical Unit Number) and a particular storage address within that specific logical unit (e.g., an LBA or Logical Block Address) for storing content 118 within data array 130.

As discussed above and depending on the manner in which first cache system 126 is configured, data caching process 10 may immediately write content 118 to data array 130 (if first cache system 126 is configured as a write-through cache) or may subsequently write content 118 to data array 130 (if first cache system 126 is configured as a write-back cache).

Assuming that first cache system 126 in this example is configured as a write-through cache, data caching process 10 may immediately write content 118 to LUN0/LBA0 within data array 130 (as defined within write request 116). Additionally, data caching process 10 may locally-store content 118 within first cache system 126 and may amend content directory 250 to include an entry (e.g., entry 260) that defines the data array storage address 200/202 (e.g. LUN0/LBA0); first cache address 254 (e.g., 001011), and content identifier 256 (e.g., acdfcla) for content 118.

As discussed above, data array 130 may include second cache system 128. Accordingly, data caching process 10 may execute the above described functionality with respect to second cache system 128.

Figure 3:
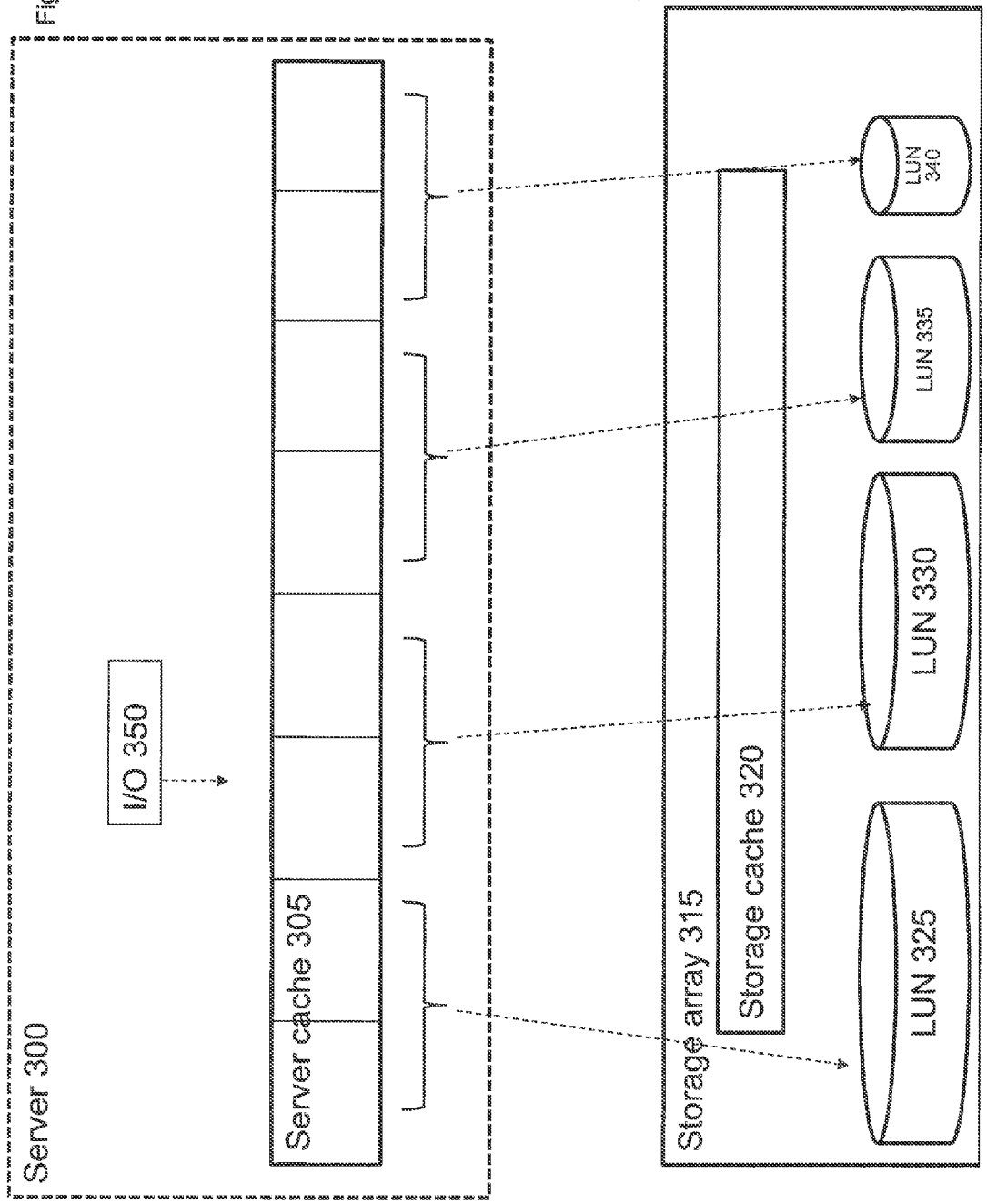
FIG. 3 is a simplified illustration of a data storage system with a server cache divided in pieces and assigned to LUNs, in accordance with an embodiment of the present disclosure.

Refer now to the example embodiment of FIG. 3. In the example embodiment of FIG. 3, Server 300 has server cache 305. Server cache 305 is used to cache data stored on storage array 315. By storing data from storage array 315 at cache 305, server cache 305 may enable quicker access to the data than if a request, such as IO 350, was sent to storage array 315.

Storage array 315 has storage cache 320, LUN 325, LUN 330, LUN 335, and LUN 340. Each LUN of storage array 315 may have different performance capabilities. Storage cache 320 on storage array 315 may enable storage array 315 to answer requests from server 300 by storing data on LUNs without having to request the data from the backend devices storing the LUN.

Server 300 has server cache 305 partitioned evenly between each LUN on storage array 315. Specifically, in this embodiment, each LUN has an equal portion of server cache allocated to store data from that LUN. Thus, in this embodiment, server cache 305 stores some data for each LUN on storage array 315 to service requests without sending the request to storage array 315. In certain embodiments, this type of allocation may not be optimal if some LUNs have more data requests as other LUNs may be allocated a portion of the storage cache that the LUN is not actively using.

Figure 4:
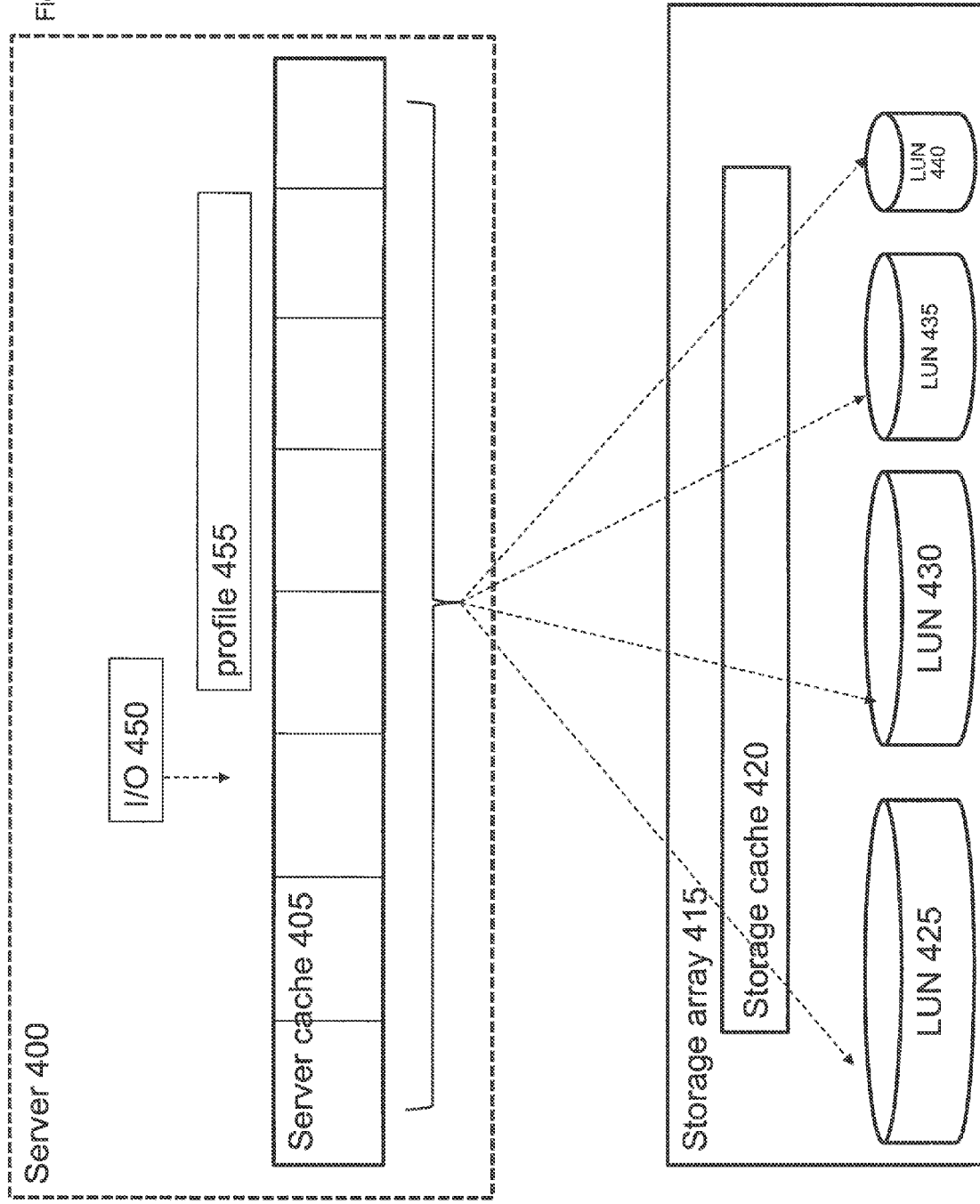
FIG. 4 is a simplified illustration of a data storage system with a server cache assigned across LUNs, in accordance with an embodiment of the present disclosure.

Refer now to the example embodiment of FIG. 4. In the example embodiment of FIG. 4, server 400 has server cache 405 and profile 455. Profile 455 is a profile which describes the IO tracking information for server cache 405. In this embodiment, metadata profile 455 is mapped proportionately to the size of server cache 405.

Storage array 415 has storage cache 420 and LUN 425, LUN 430, LUN 435, and LUN 440. Server cache 405 is allocated to store data for LUNs on storage array 415. Specifically, profile 455 may keep information denoting which data the IO should knock out of the cache. In this embodiment the metadata may indicate the least recently used (LRU) IO to be knocked out of server cache 405. In certain embodiments, this type of metadata to server cache mapping may not be optimal when a LUN is performing a set of sequential writes or other write profile which may not lend itself well to a LRU type cache replacement algorithm as sequential reads and write may be served with a low response time from SATA devices. In certain of these embodiments, putting data that may be served from low latency devices may not be beneficial. In other embodiments, the example of FIG. 4 may not be optimal if one or more of the LUNs are reading or writing in a random distribution as repeated hits may not occur and thus caching the data for such LUs or such locations may not be beneficial.

In other embodiments, a meta data profile may includes meta data for recent IOs arriving at a server cache and may keep tracking IO if data did not enter or leave the cache, i.e. served by the cache. In some embodiments, a meta data profile may be larger than the meta data needed to keep tracking in a server cache and may be used to make better decisions on the cache management.

In certain embodiments of the current disclosure, a metadata profile may be created for the server cache. In some embodiments, the metadata profile may track meta data representing data which is several times the server cache. In certain embodiments, the metadata profile may track enough data for different types of analysis to be performed on the metadata profile. In at least one embodiment, the metadata profile may be large enough to determine what type of read/write operations are being performed on a LUN. In at least one embodiment, the metadata may enable IO not to be stored in the server cache or allocated to a LUN if a set of sequential writes are being performed on the LUN.

In some embodiments, the IO activity may be tracked for meta data as if a server cache area was much larger. In further embodiments, a machine learning based algorithm or simulated annealing may be used to determine what cache partitioning would yield the best performance based on the tracked IO activity. In a first embodiment, Increasing the cache for one LU and decreasing it for another LU may increase the total cache hits and may result in a change in the cache distribution to optimize the distribution. In most embodiments, the system may find the optimal distribution of cache between the LUs to yield the highest cache hit. In certain embodiments, the system may calculate for each distribution what the expected hit rate would be (given the cache meta data statistics) and a machine learning algorithm may be used to find an optimal partition.

In a particular embodiment, there may be two LUs with the amount of IO activity to each LU. In this embodiment, LU 1 has a size 100 TB. In this embodiment, 99 percent of the IOs to LU1 go to 80 GB of the disk of LU 1 randomly and the rest of the IOs go randomly the rest of disk of LU 1. In this embodiment, LU 2 has a size 50 TB but 80 percent of the IOs go to 20 GB of the disk of LU 2 and the rest of the IO to LU 2 are random. In this embodiment, both disks have similar access profile for IO/sec.

In a particular embodiment, the server cache is 100 GB. If the server cache were partitioned to give 50 GB to each LU, LU 2 will get 80% hit and LU1 will get 0.99*50/80~62%, resulting in an about 71% hits in the cache. In an alternative embodiment, if 80 GB is assigned to LU 1 and 20 GB is assigned to LU2 the hit rate will be 89.5%, which may be a significant improvement. In most embodiments, the cache algorithm may detect that the best partition is if 80 GB to LU 1 and 20 GB to LU2 since this is the partition which may give the most hits.

In further embodiments, other analysis may be performed on the metadata profile to determine what information should be kept in the server cache. In an embodiment, based on the meta data in the profile it may be decided which entries should remain in cache and which should not. In further embodiments, it may be decided how to partition the cache. In still further embodiments, it may be decided which entries should remain and how to partition the cache between LUNs.

Figure 5:
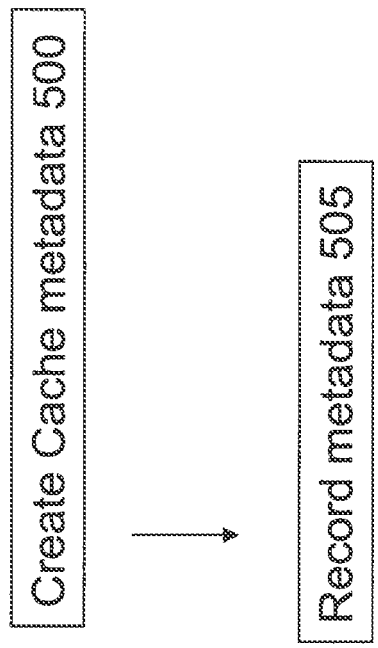
FIG. 5 is a simplified example of a method for creating metadata associated with IO being written to the server cache, in accordance with an embodiment of the present disclosure.
Figure 8:
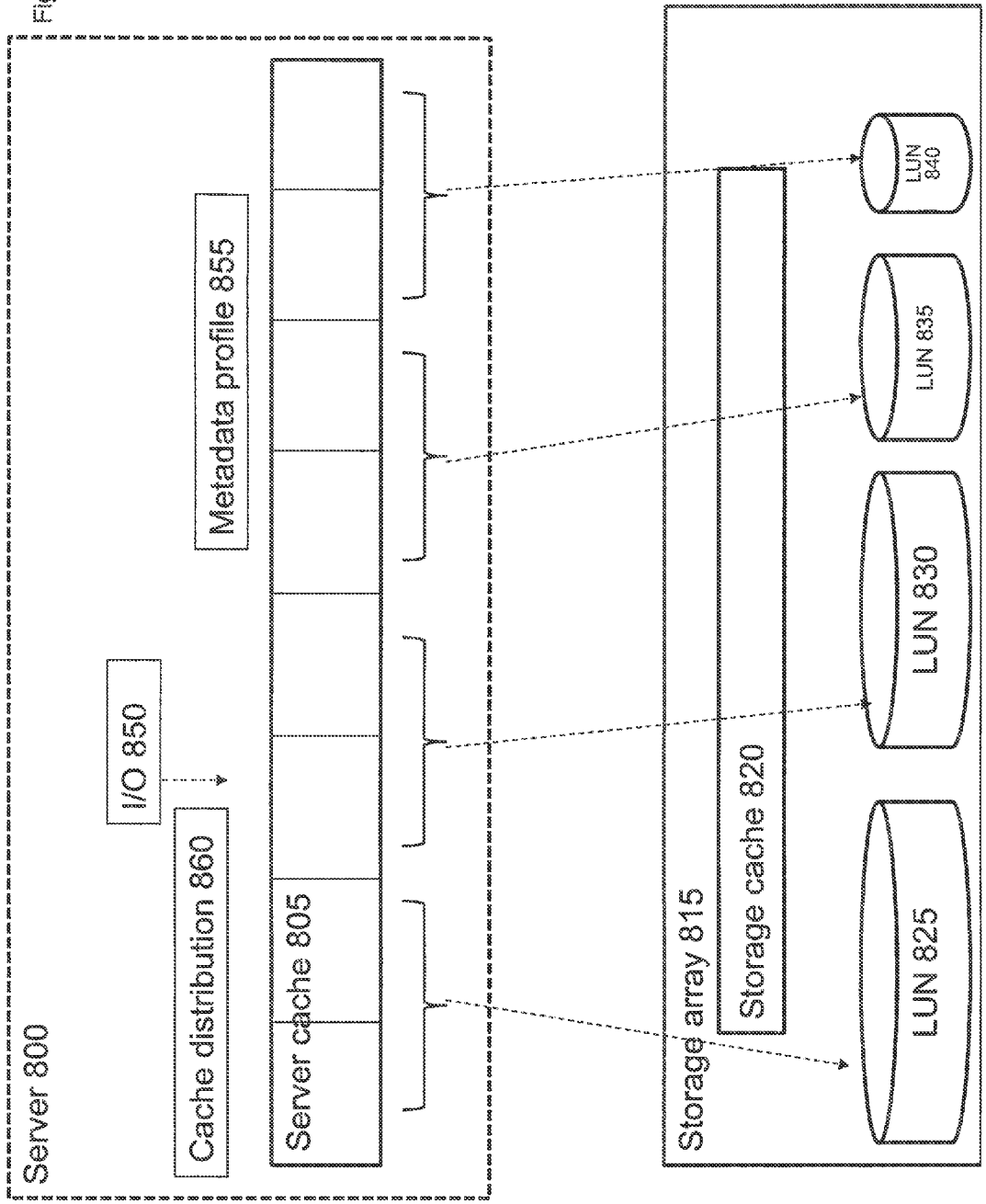
FIG. 8 is a simplified illustration of a data storage system with a server cache divided in pieces and assigned to LUNs, in accordance with an embodiment of the present disclosure.
Figure 9:
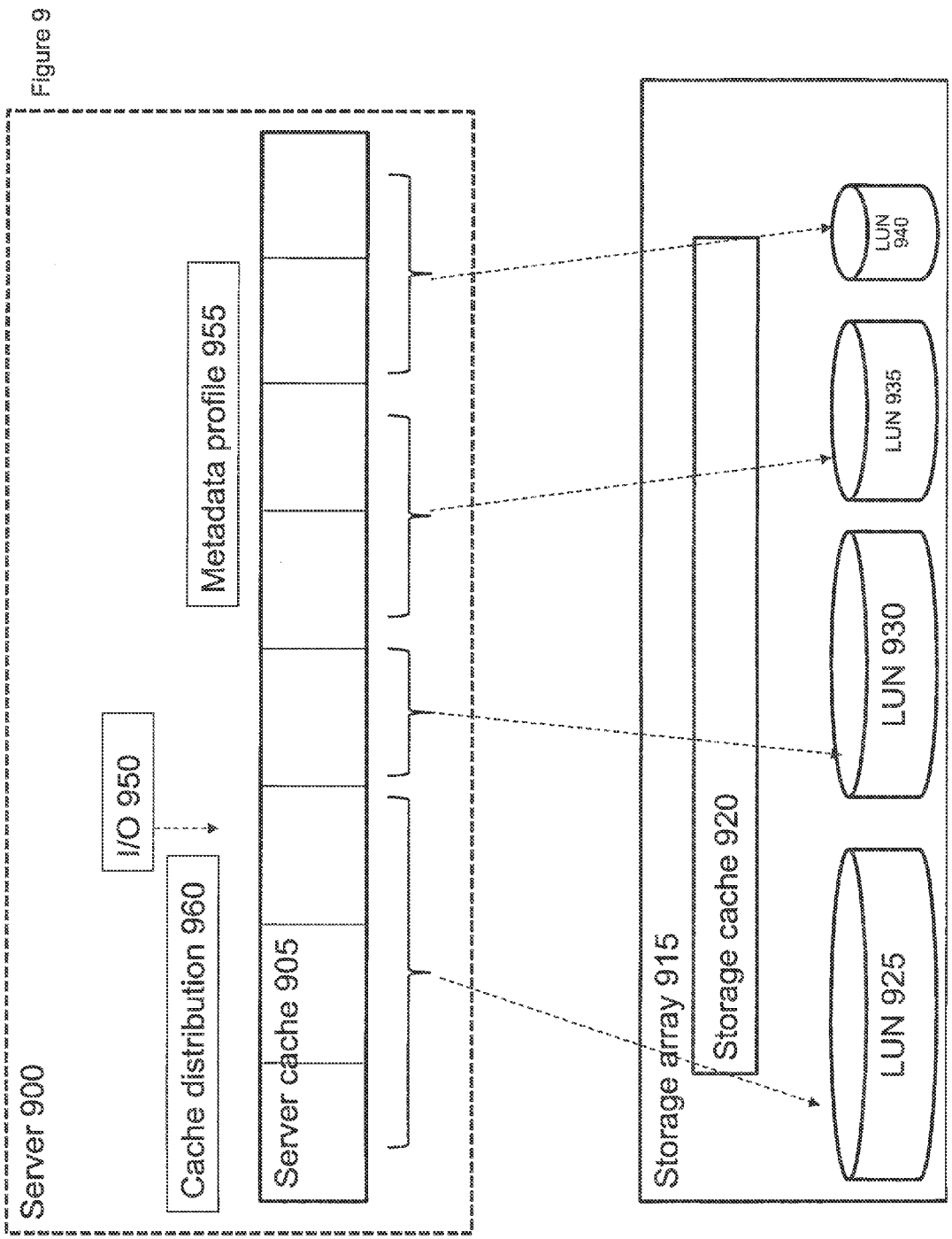
FIG. 9 is a simplified illustration of a data storage system with a server cache divided in pieces being reassigned between LUNs based on a calculated distribution, in accordance with an embodiment of the present disclosure.
Figure 10:
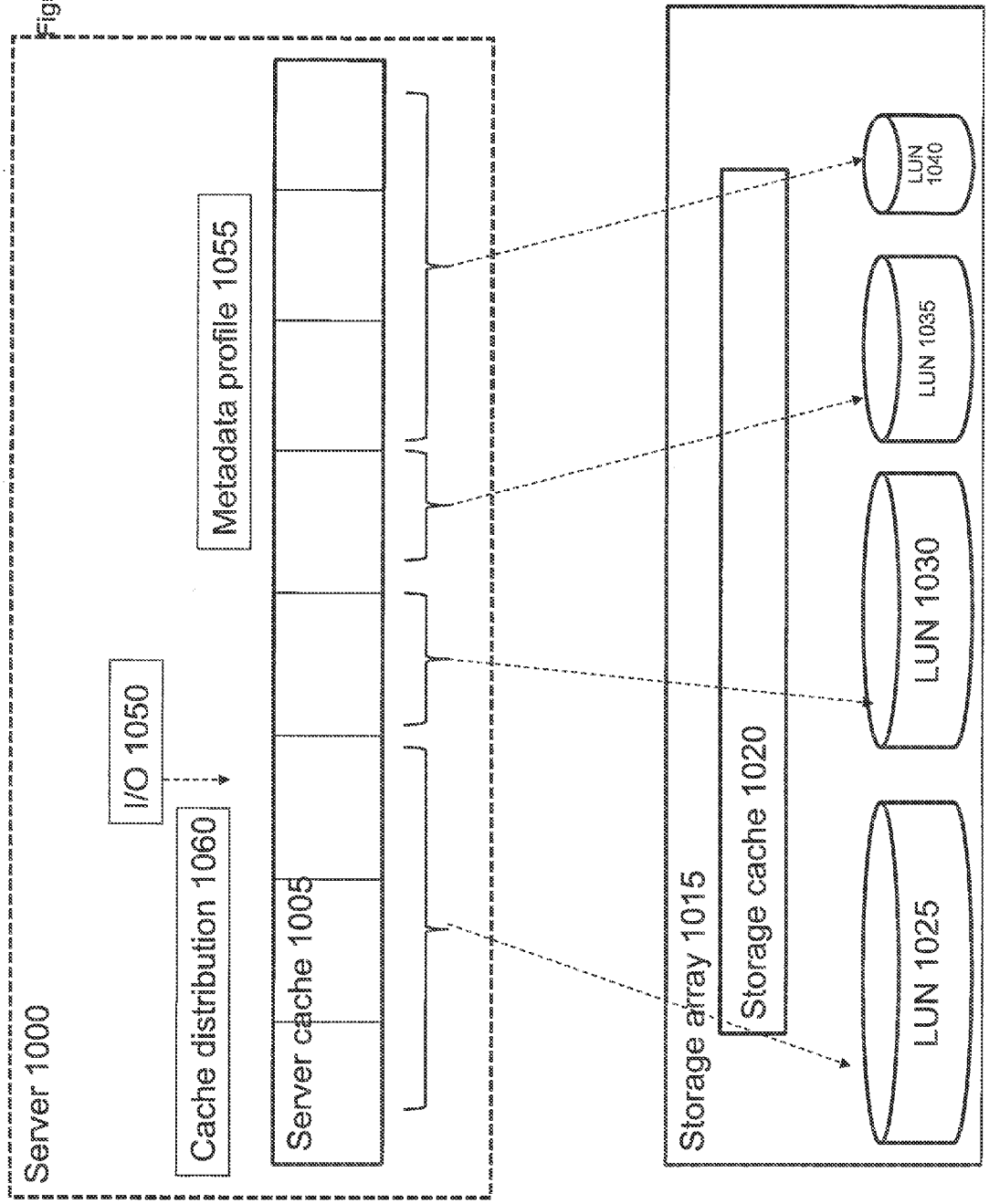
FIG. 10 is a simplified alternative illustration of a data storage system with a server cache divided in pieces being reassigned between LUNs based on a calculated distribution, in accordance with an embodiment of the present disclosure.

Refer now to the example embodiments of FIGS. 5 and 8. Server 800 has created metadata profile 855 to track IO, such as IO 850, from server 800 to server cache 805 and storage array 815. (step 500). Meta data of IO from server 800 to storage array 815 is recorded in profile 855 (step 505).

Figure 6:
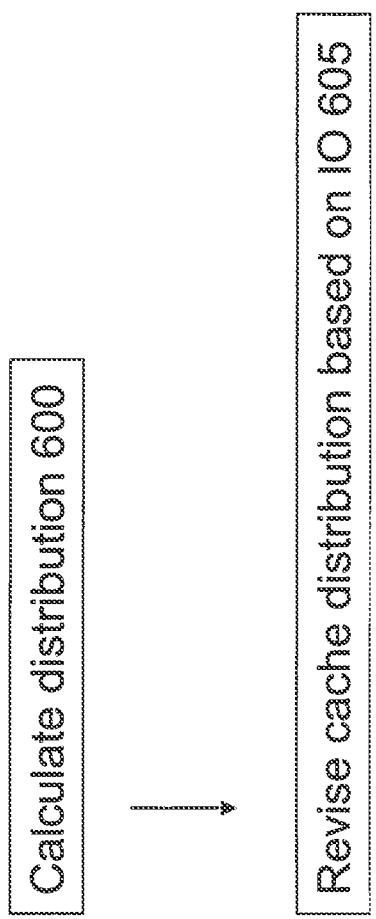
FIG. 6 is a simplified example of a method for calculating a distribution of the server cache for each LUN based on collected IO metadata, in accordance with an embodiment of the present disclosure.
Figure 7:
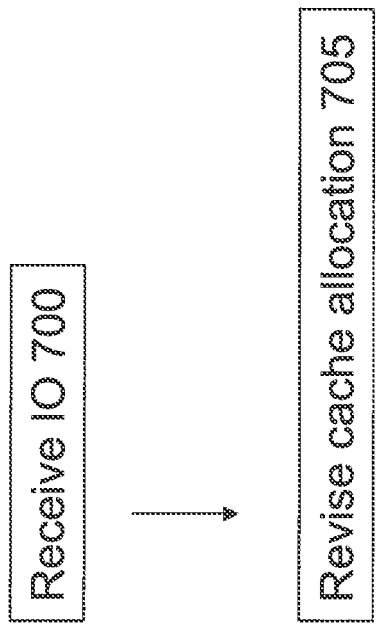
FIG. 7 is a simplified example of a method of redistributing server cache allocation based on a calculated distribution, in accordance with an embodiment of the present disclosure.

Refer now to the example embodiments of FIGS. 6, 7, and 8. A calculation is made for the distribution of server cache 305 between LUNS on Storage array 815 based on metadata profile 855 to create cache distribution 860 (step 600). The distribution of server cache 805 will be made on cache distribution 860 (step 705).

Refer now to the example embodiments of FIGS. 7, 8, 9, and 10. In these example embodiments, metadata profile 855 has been recorded, cache distribution 860 has been calculated and server cache is reallocated based on the cache distribution 860. In FIG. 8, server cache 805 is evenly distributed between LUN 825, LUN 830, LUN 835, and LUN 840. The distribution given by cache distribution 860 does not match this distribution. IO 850 is received by server 800 (step 705). Server cache 805 is revised to be that of Server cache 905 in FIG. 9 based on server cache distribution 860 by changing the allocation of server cache to LUNs. In these embodiments, the amount of server cache 305 allocated to LUN 925 is increased and the amount of server cache allocated to LUN 930 is decreased. In these embodiments, the increases and decrease of allocation of server cache 905 to LUNs may be done dynamically so that when new entries for LUN 925 arrive older, entries for LUN 930 are erased until cache is balanced with new partition size.

Server 900 receives IO 950 (step 700). The allocation of server cache 905 is revised to be that of server cache 1005 based on cache distribution 960 (step 705). In the example embodiment of FIG. 10, the allocation of server cache 1005 to LUN 1035 is reduced and the allocation to LUN 1040 is increased. In certain embodiments, the method of FIG. 7 may be applied iteratively until the storage cache reaches the cache distribution. In some embodiments, this may include changing the amount of cache allocated to each LUN based on the cache distribution.

In other embodiments, the allocation of a server cache may be shifted into any number of allocations based on the LUNs in a storage array attached to the server. In most embodiments, the allocation of the server cache may be based on the cache distribution calculated from a metadata profile. The metadata profile may enable the allocation to be based on many different types of predictive algorithms. In still further embodiments, each IO that occurs may be recorded in the metadata profile and may enable refinement of the cache distribution. In certain embodiments, the calculation or recalculation of the desired cache distribution may be applied periodically, for instance the recalculation for a new distribution may occur every 10 minutes.

Figure 11:
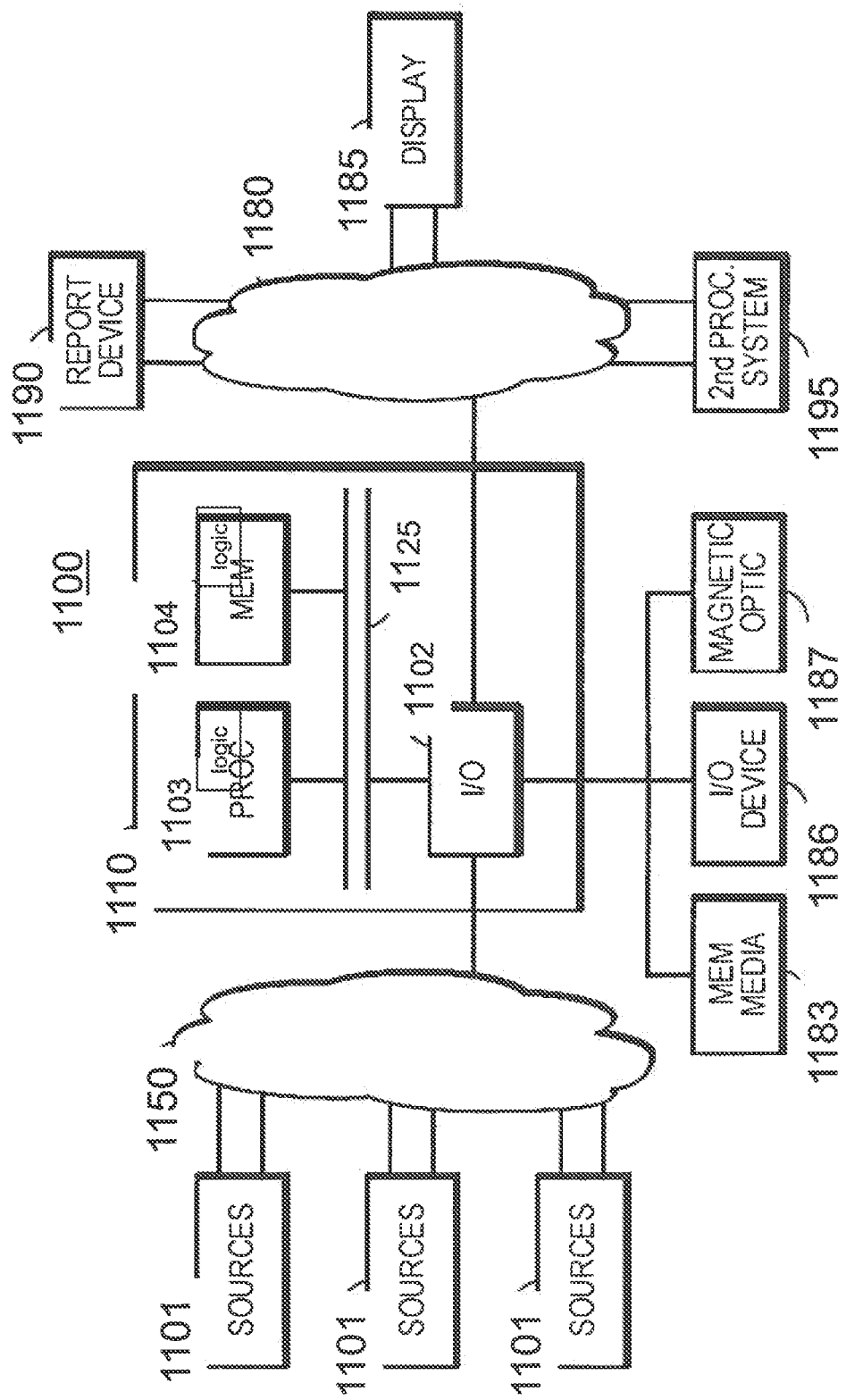
FIG. 11 is an example of an embodiment of an apparatus that may utilize the techniques described herein, in accordance with an embodiment of the present disclosure.
Figure 12:
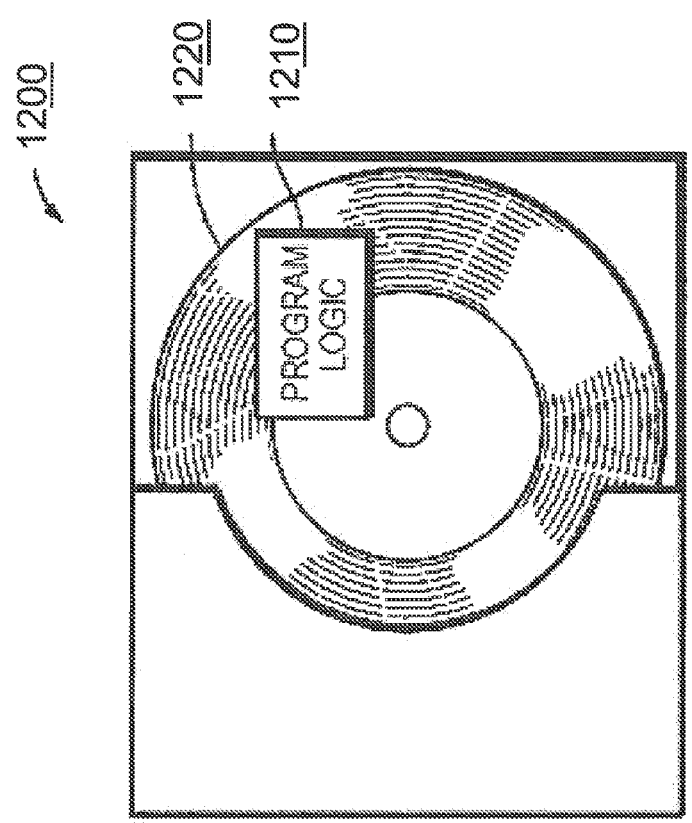
FIG. 12 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor 1003 to provide a unique apparatus that operates analogously to specific logic circuits. As such a general purpose digital machine can be transformed into a special purpose digital machine. FIG. 11 shows Program Logic 1134 embodied on a computer-readable medium 1130 as shown, and wherein the Logic is encoded in computer-executable code configured for carrying out the reservation service process of this invention and thereby forming a Computer Program Product 1100. The logic 1134 may be the same logic 1040 on memory 1004 loaded on processor 1003. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIG. 5 and FIG. 7. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A system comprising:
a server having a cache;
a storage array, the storage array having a plurality of storage mediums and a storage cache and storing data; and
computer-executable logic operating in memory, wherein the computer-executable program logic is configured to enable one or more processors to execute:
recording metadata of Input\Output (IO) sent from the server to a storage array;
calculating a distribution of a server cache to the storage mediums based on the metadata;
receiving an IO directed to the storage array; and
revising an allocation of the server cache to the plurality of storage mediums based on the calculated distribution and the IO.

2. The system of claim 1 wherein the calculated distribution determines a cache allocation which minimizes the number of read misses in the server cache.

3. The system of claim 1 wherein the calculate distribution determines a cache allocation which maximizes the read hits in the server cache.

4. The system of claim 1 where the metadata recorded is large enough for the calculation of the distribution to determine whether the IO to the plurality of storage mediums is a random pattern or a predicable pattern.

5. The system of claim 4 wherein the server cache will not be assigned to random read patterns.

6. The system of claim 1 where the metadata recorded is large enough for the calculation of the distribution to determine what percentage of IO is directed to what portion of each of the plurality of storage mediums.

7. The system of claim 1 where the cache partitioning is recalculated based on the statistics at predetermined amounts of time.

8. A computer implemented method comprising:
recording metadata of Input\Output (IO) sent from a server to a storage array;
wherein the storage array comprises storage mediums;
calculating a distribution of a server cache to the storage mediums based on the metadata;
receiving an IO directed to the storage array; and
revising an allocation of the server cache to the plurality of storage mediums based on the calculated distribution and the IO.

9. The method of claim 8 wherein the calculated distribution determines a cache allocation which minimizes the number of read misses in the server cache.

10. The method of claim 8 wherein the calculate distribution determines a cache allocation which maximizes the read hits in the server cache.

11. The method of claim 8 where the metadata recorded is large enough for the calculation of the distribution to determine whether the IO to the plurality of storage mediums is a random pattern or a predicable pattern.

12. The method of claim 11 wherein the server cache will not be assigned to random read patterns.

13. The method of claim 8 where the metadata recorded is large enough for the calculation of the distribution to determine what percentage of IO is directed to what portion of each of the plurality of storage mediums.

14. A computer program product comprising:
a non-transitory computer readable medium encoded with computer executable program, the code enabling:
recording metadata of Input\Output (IO) sent from a server to a storage array; wherein the storage array comprises storage mediums;
calculating a distribution of a server cache to the storage mediums based on the metadata;
receiving an IO directed to the storage array; and
revising an allocation of the server cache to the plurality of storage mediums based on the calculated distribution and the IO.

15. The computer program product of claim 14 wherein the calculated distribution determines a cache allocation which minimizes the number of read misses in the server cache.

16. The computer program product of claim 14 wherein the calculate distribution determines a cache allocation which maximizes the read hits in the server cache.

17. The computer program product of claim 14 where the metadata recorded is large enough for the calculation of the distribution to determine whether the IO to the plurality of storage mediums is a random pattern or a predicable pattern.

18. The computer program product of claim 17 wherein the server cache will not be assigned to random read patterns.

19. The computer program product of claim 14 where the metadata recorded is large enough for the calculation of the distribution to determine what percentage of IO is directed to what portion of each of the plurality of storage mediums.

20. The computer program product of claim 14 where the cache partitioning is recalculated based on the statistics at predetermined amounts of time.

* * * * *